(12) United States Patent
Lee

(10) Patent No.: US 12,415,579 B2
(45) Date of Patent: Sep. 16, 2025

(54) MULTIPURPOSE MODULE, MODULE FIXING DEVICE, AND LOCKING ASSEMBLY FOR VEHICLE

(71) Applicants: HYUNDAI MOTOR COMPANY, Seoul (KR); KIA CORPORATION, Seoul (KR)

(72) Inventor: Ki Hong Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 402 days.

(21) Appl. No.: 18/076,087

(22) Filed: Dec. 6, 2022

(65) Prior Publication Data

US 2024/0166280 A1    May 23, 2024

(30) Foreign Application Priority Data

Jun. 8, 2022    (KR) .......................... 10-2022-0069754

(51) Int. Cl.
  *B62D 63/02*    (2006.01)
  *B62D 65/04*    (2006.01)

(52) U.S. Cl.
  CPC ............ *B62D 63/025* (2013.01); *B62D 65/04* (2013.01)

(58) Field of Classification Search
  CPC .. F16B 2200/97; F16B 2200/77; B62D 65/04; B62D 63/04; B62D 63/025; B62D 33/04; B60Y 2200/91; B60P 1/4485
  See application file for complete search history.

(56) References Cited

U.S. PATENT DOCUMENTS

| | | | | |
|---|---|---|---|---|
| 3,726,422 A | * | 4/1973 | Zelin | B60R 5/04 36/3 R |
| 4,303,367 A | * | 12/1981 | Bott | B60R 7/02 296/37.16 |
| 6,312,034 B1 | * | 11/2001 | Coleman, II | B60R 5/04 296/26.1 |
| 7,543,872 B1 | * | 6/2009 | Burns | B60P 1/003 296/37.16 |

* cited by examiner

*Primary Examiner* — Lori Lyjak
(74) *Attorney, Agent, or Firm* — McDonnell Boehnen Hulbert & Berghoff LLP

(57) ABSTRACT

A vehicle includes a multipurpose module replaceably coupled to a luggage zone of the vehicle, and a module fixing device coupled to the multipurpose module and configured to fix the multipurpose module to a vehicle body of the vehicle, in which the module fixing device includes one or more locking assemblies configured to fix the multipurpose module by being matched and inserted into a fixing hole provided in the multipurpose module, and a locking controller configured to control the locking assembly, in which the locking assembly includes a shape memory spring made of a shape memory alloy, a fixing protrusion connected to the shape memory spring and configured to move forward to be inserted into the fixing hole or move rearward to be separated from the fixing hole in accordance with extension or contraction of the shape memory spring, and a heater configured to apply heat to the shape memory spring, and in which the shape memory spring operates the fixing protrusion while being extended or contracted by the applied heat.

18 Claims, 18 Drawing Sheets

MULTIPURPOSE MODULE, MODULE FIXING DEVICE, AND LOCKING ASSEMBLY FOR VEHICLE

CROSS REFERENCE TO RELATED APPLICATIONS

This application claims the benefit of priority to Korean Patent Application No. 10-2022-0069754, filed on Jun. 8, 2022, in the Korean Intellectual Property Office, the disclosure of which is incorporated herein by reference.

TECHNICAL FIELD

The disclosed disclosure relates to a multipurpose module, a module fixing device, and a locking assembly for a vehicle.

BACKGROUND

To preoccupy future mobility markets and technologies, worldwide vehicle manufacturers discover, introduce, and advertise various concepts based on electric vehicles. Among the various concepts, the representative concept is a purpose-built vehicle (PBV). The PBV may be used for passenger transportation, a mobile office, courier service, cargo transportation, a game room, a cafeteria, a shop, and the like by variously arranging seats. The PBV provides concepts that may be used for various purposes by easily changing structures according to various purposes instead of a single purpose.

To implement the various concepts, a vehicle is divided into a body and a platform, and a body region is configured to conform to the purpose and coupled to the platform, which may provide a vehicle with various concepts suitable for the purpose while replacing several bodies in respect to a single platform.

However, a separate facility is required to separate and couple the body and the platform, and spaces and workers are required to replace the bodies and store and manage the bodies that are not used. For this reason, it is difficult to obtain an advantage over vehicles in the related art.

SUMMARY

In the case of the concept of the purpose-built vehicle (PBV) in which the body and the platform are separated from or coupled to each other, the body region is divided into a drive zone essential in common to drive the vehicle, and a luggage zone, i.e., a region that may be changed depending on the purpose of the vehicle. The concept for replacing the entire body including both the drive zone and the luggage zone requires a separate facility and workers required to manage the vehicle and spaces for storing and managing the replaced body. For this reason, it is difficult to obtain an advantage over vehicles in the related art in terms of management for each vehicle. According to one aspect of the disclosure proposed to cope with inefficient parts of the concept while maintaining the purpose of the purpose-built vehicle that is the PBV concept in view of each vehicle, a body and a platform of the PBV are coupled to each other, and a body region includes a drive zone, which is essential in common, and a luggage zone that may be changed depending on the purpose. In this case, the drive zone is fixed in common to drive the vehicle. The luggage zone provides various modules that may be changed depending on the purpose of the vehicle and used for passenger transportation, a mobile office, courier service, cargo transportation, a game room, a cafeteria, a shop, and the like by variously arranging seats. The luggage zone provides a structure that may be separated from or coupled to the body. An aspect of the disclosure is to provide a multipurpose module, module fixing device, and locking assembly for a vehicle, in which the locking assembly is included in a luggage zone and operated by a shape memory spring, and the multipurpose module is coupled to the module fixing device equipped with a constituent component suitable for the purpose, such that the purpose of the vehicle may be easily changed.

In accordance with an aspect of the disclosure, a vehicle includes a multipurpose module replaceably coupled to a luggage zone of the vehicle, and a module fixing device coupled to the multipurpose module and configured to fix the multipurpose module to a vehicle body of the vehicle, in which the module fixing device includes one or more locking assemblies configured to fix the multipurpose module by being matched and inserted into a fixing hole provided in the multipurpose module, and a locking controller configured to control an operation of the locking assembly, in which the locking assembly includes a shape memory spring made of a shape memory alloy, a fixing protrusion connected to the shape memory spring and configured to operate forward to be inserted into the fixing hole or operate rearward to be separated from the fixing hole in accordance with extension or contraction of the shape memory spring, and a heater configured to apply heat to the shape memory spring, and in which the shape memory spring operates the fixing protrusion while being extended or contracted by the applied heat.

The fixing protrusion may operate forward when no heat is applied to the shape memory spring, and the fixing protrusion may operate rearward when heat is applied to the shape memory spring.

The locking assembly may further include a reaction force spring configured to apply an elastic force to the fixing protrusion in a forward direction, and driving power implemented by shape deformation of the shape memory spring may be higher than the elastic force of the reaction force spring.

A rail may be provided on the multipurpose module, and a guide may be provided on the module fixing device, such that the module fixing device and the multipurpose module may be coupled as the rail is inserted into the guide, and the locking assembly may be provided in the guide and matched and inserted into the fixing hole provided in the rail.

The locking assembly may be provided at one side of the guide and protrude when the fixing protrusion operates forward, a protrusion fixing groove may be provided at the other side of the guide, and the fixing protrusion may be inserted into the protrusion fixing groove when the fixing protrusion operates forward.

The multipurpose module may include a fixing base on which a constituent component is mounted, and the rail may be provided at a lower side of the fixing base.

The rail may be a T-shaped rail including a web coupled to the fixing base, and a flange coupled to the web, and the fixing hole may be provided in the web.

The multipurpose module may be coupled to the module fixing device in a forward/rearward direction.

In accordance with another aspect of the disclosure, a module fixing device for a vehicle includes one or more locking assemblies configured to fix a multipurpose module by being matched and inserted into a fixing hole provided in the multipurpose module replaceably coupled to a luggage zone of a vehicle, and a locking controller configured to control an operation of the locking assembly, in which the locking assembly includes a shape memory spring made of a shape memory alloy, a fixing protrusion connected to the shape memory spring and configured to operate forward to be inserted into the fixing hole or operate rearward to be separated from the fixing hole in accordance with extension or contraction of the shape memory spring, and a heater configured to apply heat to the shape memory spring, and in which the shape memory spring operates the fixing protrusion while being extended or contracted by the applied heat.

The fixing protrusion may operate forward when no heat is applied to the shape memory spring, and the fixing protrusion may operate rearward when heat is applied to the shape memory spring.

The locking assembly may further include a reaction force spring configured to apply an elastic force to the fixing protrusion in a forward direction, and driving power implemented by shape deformation of the shape memory spring may be higher than the elastic force of the reaction force spring.

The module fixing device may have a guide into which a rail provided on the multipurpose module is inserted, such that the module fixing device and the multipurpose module may be coupled as the rail is inserted into the guide, and the locking assembly may be provided in the guide and matched and inserted into the fixing hole provided in the rail.

The locking assembly may be provided at one side of the guide and protrude when the fixing protrusion operates forward, a protrusion fixing groove may be provided at the other side of the guide, and the fixing protrusion may be inserted into the protrusion fixing groove when the fixing protrusion operates forward.

In accordance with another aspect of the disclosure, a multipurpose module is replaceably coupled to a vehicle and includes a fixing hole into which a locking assembly provided and operated in the vehicle is matched and inserted, and a rail inserted into a guide provided in the vehicle and configured to couple the multipurpose module to the vehicle.

The fixing hole may be provided in the rail.

The multipurpose module may further include a fixing base on which a constituent component is mounted, and the rail may be provided at a lower side of the fixing base.

The rail may be a T-shaped rail including a web coupled to the fixing base, and a flange coupled to the web, and the fixing hole may be provided in the web.

In accordance with another aspect of the disclosure, a locking assembly includes a shape memory spring made of a shape memory alloy, a fixing protrusion connected to the shape memory spring and configured to operate forward to be inserted into a fixing hole provided in a coupling object or operate rearward to be separated from the fixing hole in accordance with extension or contraction of the shape memory spring, and a heater configured to apply heat to the shape memory spring, and in which the shape memory spring operates the fixing protrusion while being extended or contracted by the applied heat.

The fixing protrusion may operate forward when no heat is applied to the shape memory spring, and the fixing protrusion may operate rearward when heat is applied to the shape memory spring.

The locking assembly may further include a reaction force spring configured to apply an elastic force to the fixing protrusion in a forward direction, in which driving power implemented by shape deformation of the shape memory spring is higher than the elastic force of the reaction force spring.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Figure 1:
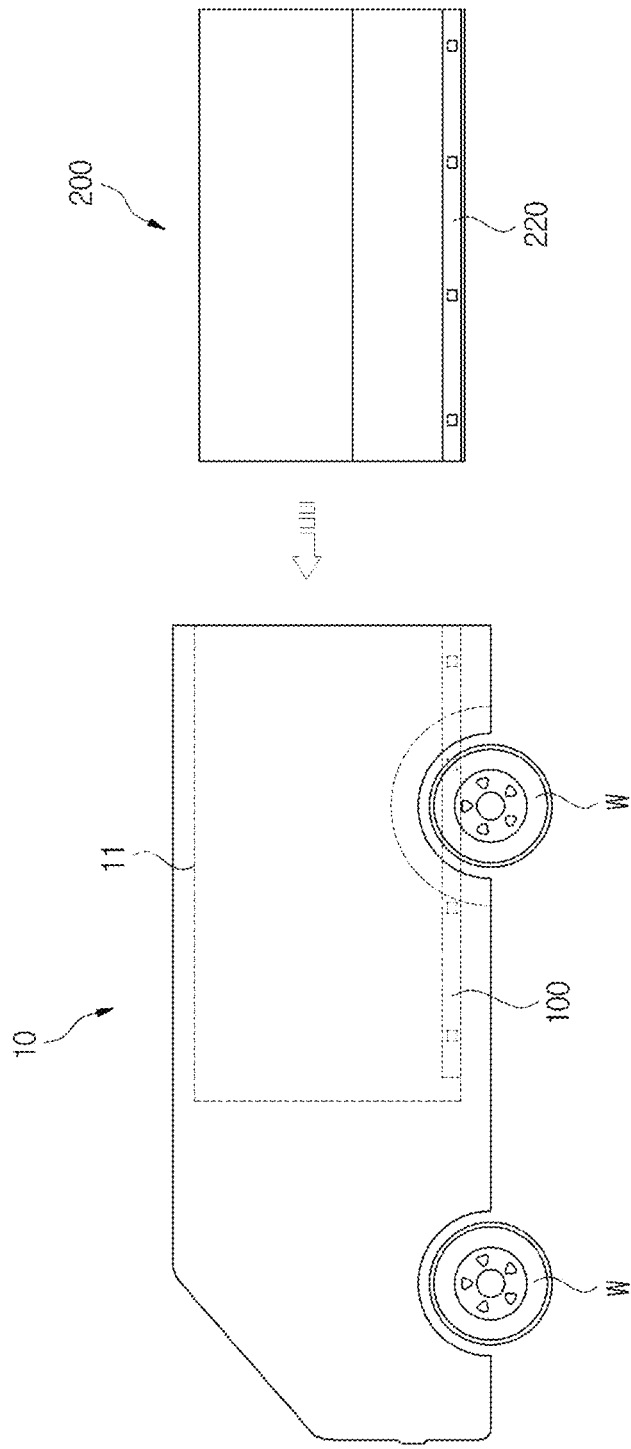
FIG. 1 is a view illustrating an example of a vehicle according to the embodiment.

Like reference numerals indicate like constituent elements throughout the specification. The present specification does not explain all the elements in the embodiments, and the general contents in the technical field to which the present disclosure pertains or the contents repeatedly described in the embodiments will be omitted.

Throughout the present specification, when one constituent element is referred to as being "connected to" another constituent element, one constituent element can be "directly connected to" the other constituent element, and one constituent element can also be "indirectly connected to" the other constituent element. The indirect connection includes a connection through a wireless communication network.

In addition, unless explicitly described to the contrary, the word "comprise/include" and variations such as "comprises/includes" or "comprising/including" will be understood to imply the inclusion of stated elements, not the exclusion of any other elements.

Singular expressions include plural expressions unless there is an exception in the context.

In addition, the term "part," "device," "block," "member," "module," or the like can mean a unit that processes one or more functions or operations. For example, the term may mean at least one process processed by at least one hardware stored in a field-programmable gate array (FPGA), an application specific integrated circuit (ASIC), or the like, or at least one software or processor stored in a memory.

The reference numeral assigned to each step is used to identify each step, and the reference numeral does not represent the order between the steps. Each step may be performed regardless of the specified order unless the specified order is clearly described in the context.

Hereinafter, embodiments of a vehicle and a method of controlling the same according to one aspect will be described in detail with reference to the accompanying drawings.

FIG. 1 is a view illustrating an example of a vehicle according to the embodiment.

Referring to FIG. 1, a vehicle 10 according to an embodiment of the present disclosure includes a multipurpose module 200 replaceably coupled to a luggage zone 11 of the vehicle 10, and a module fixing device 100 coupled to the multipurpose module 200 and configured to fix the multipurpose module 200 to a vehicle body of the vehicle 10.

The vehicle 10 illustrated in FIG. 1 may include road wheels W used to allow the vehicle 10 to travel, a driving zone used to drive the vehicle 10, and the luggage zone 11 used for various purposes.

Various constituent components illustrated in FIG. 14 may be mounted in the luggage zone 11 and perform functions suitable for the purpose of the vehicle. For example, the luggage zone 11 may be equipped with a luggage loading storage for transporting large-scale freight in FIG. 14A, a freezer and refrigerator for transporting frozen items in FIG. 14B, module for courier freight transport in FIG. 14C, seats for transporting passengers in FIG. 14D, or a cooking facility used for a food truck in FIG. 14E. In the present disclosure, the multipurpose module 200 equipped with various constituent components is coupled to the luggage zone 11 of the vehicle 10, such that the constituent components may be easily changed.

The multipurpose module 200 may include the constituent component suitable for the purpose of the vehicle 10 so that the vehicle 10 may be used for various purpose. Therefore, the constituent components of the vehicle 10 may be temporarily changed by changing the multipurpose module 200 coupled to the luggage zone 11 of the vehicle 10, which makes it possible to use the vehicle 10 for various purposes.

The configuration in which the multipurpose module 200 coupled to the luggage zone 11 in the body of the vehicle 10 is changed is advantageous in changing modules and storing and managing the modules because the size of the module is smaller than the body in comparison with a configuration in which a platform and the body of the vehicle 10 are separated and the body is changed to constitute the vehicle.

In the embodiment of the present disclosure, the module fixing device 100 and the multipurpose module 200 may be coupled to each other in a sliding manner.

In the embodiment of the present disclosure, the multipurpose module 200 may be coupled to the module fixing device 100 in a forward/rearward direction. That is, the multipurpose module 200 may be coupled to the vehicle 10 while sliding in a direction from the rear side to the front side of the vehicle 10. To this end, the multipurpose module 200 has rails 220, the module fixing device 100 has guides 130 into which the rails 220 are inserted, and the rails 220 are inserted into the guides 130, such that the module fixing device 100 and the multipurpose module 200 may be coupled to each other.

Hereinafter, detailed structures of the module fixing device 100 and the multipurpose module 200 will be described.

Figure 2:
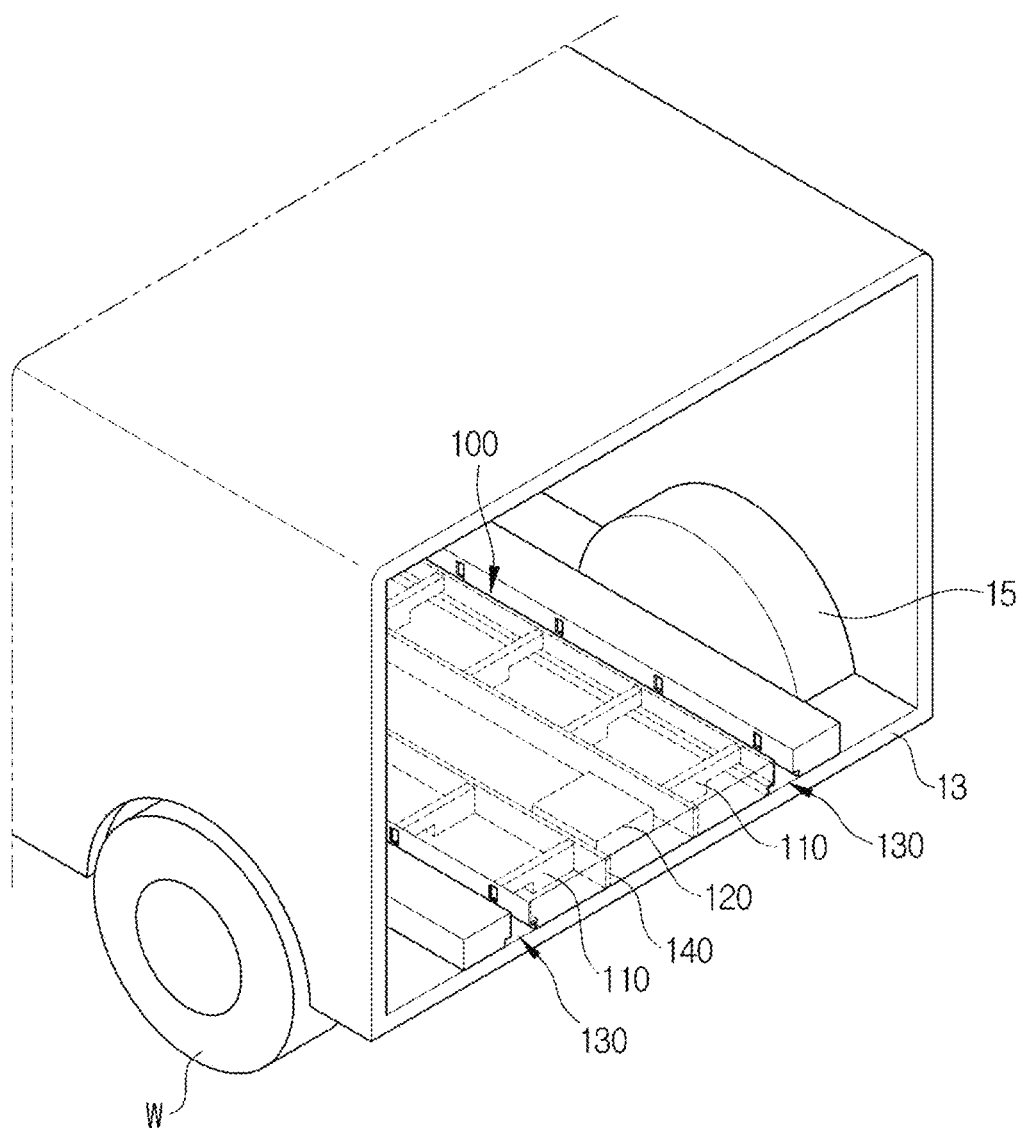
FIG. 2 is a view schematically illustrating a module fixing device of the vehicle according to the embodiment.

FIG. 2 is a view schematically illustrating a module fixing device of the vehicle according to the embodiment.

Referring to FIG. 2, the module fixing device 100 according to the embodiment of the present disclosure may include one or more locking assemblies 110 configured to fix the multipurpose module 200 by being matched with and inserted into fixing holes 210 provided in the multipurpose module 200, and a locking controller 120 configured to control an operation of the locking assembly 110.

As illustrated in FIG. 2, the module fixing device 100 may include a plurality of locking assemblies 110. The locking controller 120 configured to control the operation of the locking assembly 110 may allow the locking assembly 110 to fix the multipurpose module 200. FIG. 2 illustrates the module fixing device 100 having eight locking assemblies 110 arranged on two lines, four locking assemblies 110 for each line.

Figure 3:
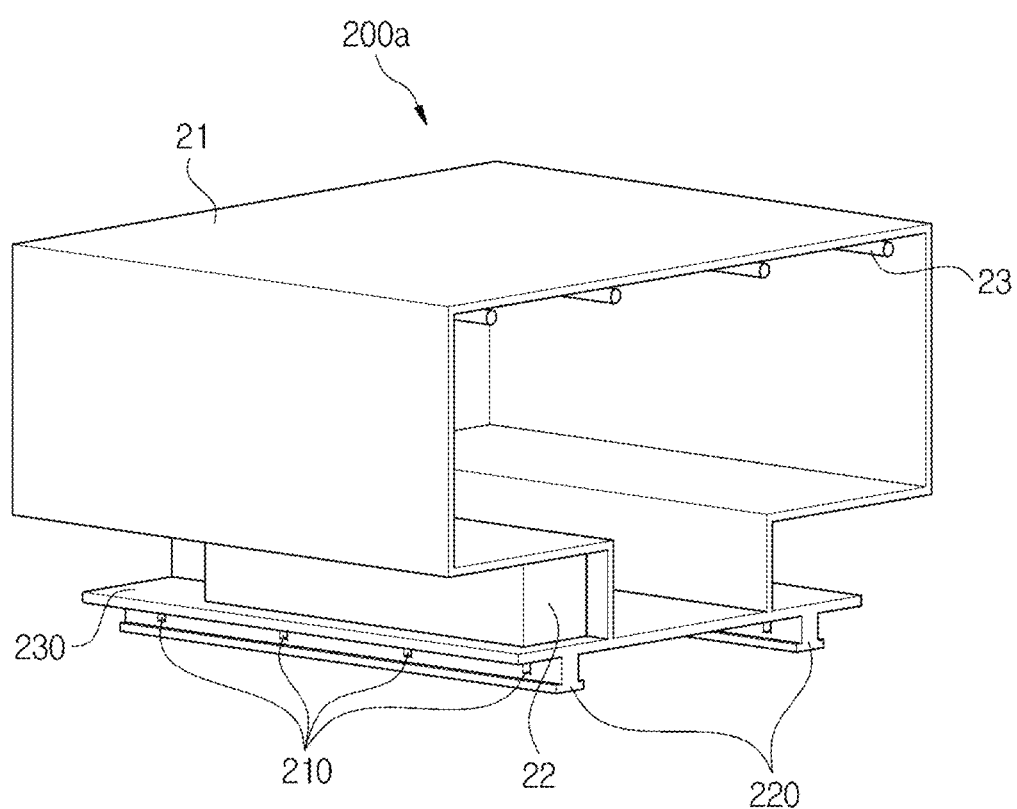
FIG. 3 is a view schematically illustrating a multipurpose module according to the embodiment.

The locking assembly 110 may be inserted into the fixing hole 210 provided in the multipurpose module 200 and fix the multipurpose module 200. To this end, the locking assembly 110 and the fixing hole 210 may be disposed to correspond in position to each other. That is, as illustrated in FIGS. 1-3, the multipurpose module 200 coupled to the module fixing device 100 having the eight locking assemblies 110 arranged on the two lines, four locking assemblies for each line, may also have the fixing holes 210 arranged on two lines, four fixing holes for each line. Therefore, the locking assembly 110 may be inserted into the fixing hole 210.

Meanwhile, the module fixing device 100 has the guide 130 into which the rail 220 provided on the multipurpose module 200 is inserted, and the rail 220 is inserted into the guide 130, such that the module fixing device 100 and the multipurpose module 200 may be coupled to each other.

In this case, the locking assembly 110 may be provided in the guide 130 and matched with and inserted into the fixing hole 210 provided in the rail 220. The structure for coupling the locking assembly 110, the guide 130, the fixing hole 210, and the rail 220 will be described below.

In the embodiment, the module fixing device 100 may be provided on a lower vehicle body 13 in the luggage zone 11. A user may mount the multipurpose module 200 on the vehicle 10 by aligning and coupling the rail 220 of the multipurpose module 200 to the guide 130 of the module fixing device 100 provided on the lower vehicle body 13 in the luggage zone 11 at the time of coupling the multipurpose module 200 to the vehicle 10.

Figure 4:
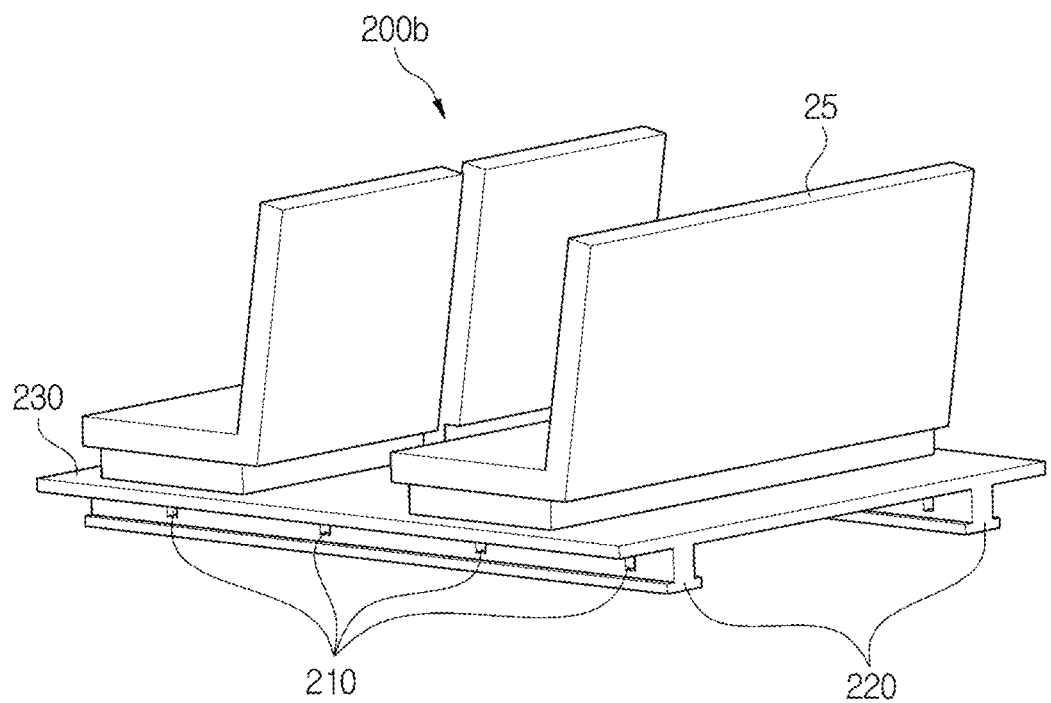
FIG. 4 is a view schematically illustrating a multipurpose module according to another embodiment.

FIGS. 3 and 4 are views schematically illustrating the multipurpose module according to the embodiments.

FIGS. 3 and 4 illustrate multipurpose modules 200a and 200b according to the embodiment. The multipurpose module 200a of the embodiment illustrated in FIG. 3 includes a freezer 21, a refrigerator 22, and a refrigeration pipe 23. When the multipurpose module 200a is coupled to the vehicle 10, such that the vehicle 10 may serve as a freezer vehicle.

Meanwhile, the multipurpose module 200b of the embodiment illustrated in FIG. 4 includes seats 25 in which passengers are seated. When the multipurpose module 200b is coupled to the vehicle 10, the vehicle 10 may serve as a multi-seat vehicle in which the passengers are seated.

FIGS. 3 and 4 exemplarily illustrate the constituent components provided in the multipurpose module 200, but the present disclosure is not limited thereto. Various constituent components may be mounted, such that the vehicle 10 may perform various functions.

That is, the multipurpose modules 200 are replaced and mounted according to the purpose of the vehicle 10 according to the embodiment of the present disclosure, such as the transportation of large-scale freight or passengers or the courier service, which makes it possible to ensure various utilization of the vehicle 10.

Meanwhile, as illustrated in FIGS. 3 and 4, the multipurpose module 200 may include the fixing hole 210 into which the locking assembly 110 provided and operated in the vehicle 10 is matched and inserted, the rail 220 inserted into the guide 130 provided in the module fixing device 100 of the vehicle 10 and configured to couple the multipurpose module 200 to the vehicle 10; and a fixing base 230 on which the constituent component is mounted.

As illustrated in FIGS. 3 and 4, the constituent components, such as the freezer 21, the refrigerator 22, the refrigeration pipe 23, and the seat 25, are mounted on the fixing base 230 so that the multipurpose module 200 may perform functions according to the purpose. When the purpose is changed, the constituent component is also changed, such that the multipurpose module 200 may perform functions according to the changed purpose.

Meanwhile, the rail 220 may be provided at a lower side of the fixing base 230. The rail 220 provided at the lower side of the fixing base 230 is inserted into the guide 130 of the module fixing device 100 provided at the lower side of the vehicle 10, as illustrated in FIG. 2, such that the multipurpose module 200 may be coupled to the vehicle 10 in a sliding manner.

As illustrated in FIGS. 3 and 4, the multipurpose module 200 may include the pair of parallel rails 220. The rails 220 are provided in parallel and coupled, in a sliding manner, to the guides 130 provided in parallel, such that the coupling may be securely maintained.

The coupling between the rail 220 and the guide 130 may allow the multipurpose module 200 to move only in one direction, i.e., the sliding direction relative to the vehicle 10. In this case, the module fixing device 100 provided in the vehicle 10 may be configured such that the locking assembly 110 is inserted into the fixing hole 210 provided in the multipurpose module 200 to prevent the multipurpose module 200 from sliding.

Meanwhile, the fixing hole 210 may be provided in the rail 220. More specifically, the rail 220 is a T-shaped rail including a web coupled to the fixing base 230, and a flange coupled to the web, and the fixing hole 210 may be provided in the web.

The locking assembly 110 may be penetratively inserted into the fixing hole 210 provided in the web to prevent the rail 220 from sliding, such that the multipurpose module 200 may be fixedly mounted on the vehicle.

In the embodiment of the present disclosure, wheel houses 15 for accommodating the road wheels W of the vehicle may protrude in the luggage zone 11. Therefore, the multipurpose module 200 may have a shape that may not interfere with the wheel house 15 when the multipurpose module 200 is coupled to the vehicle 10 in a sliding manner by the rail 220.

Figure 5:
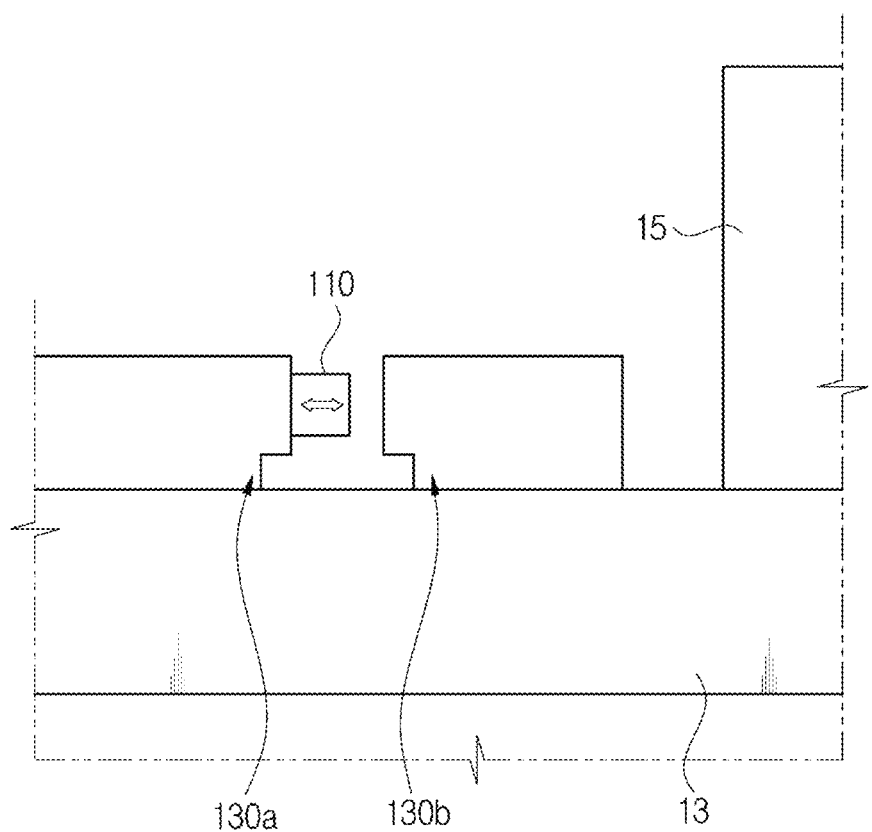
FIG. 5 is a front view of a module fixing device according to the embodiment.
Figure 6:
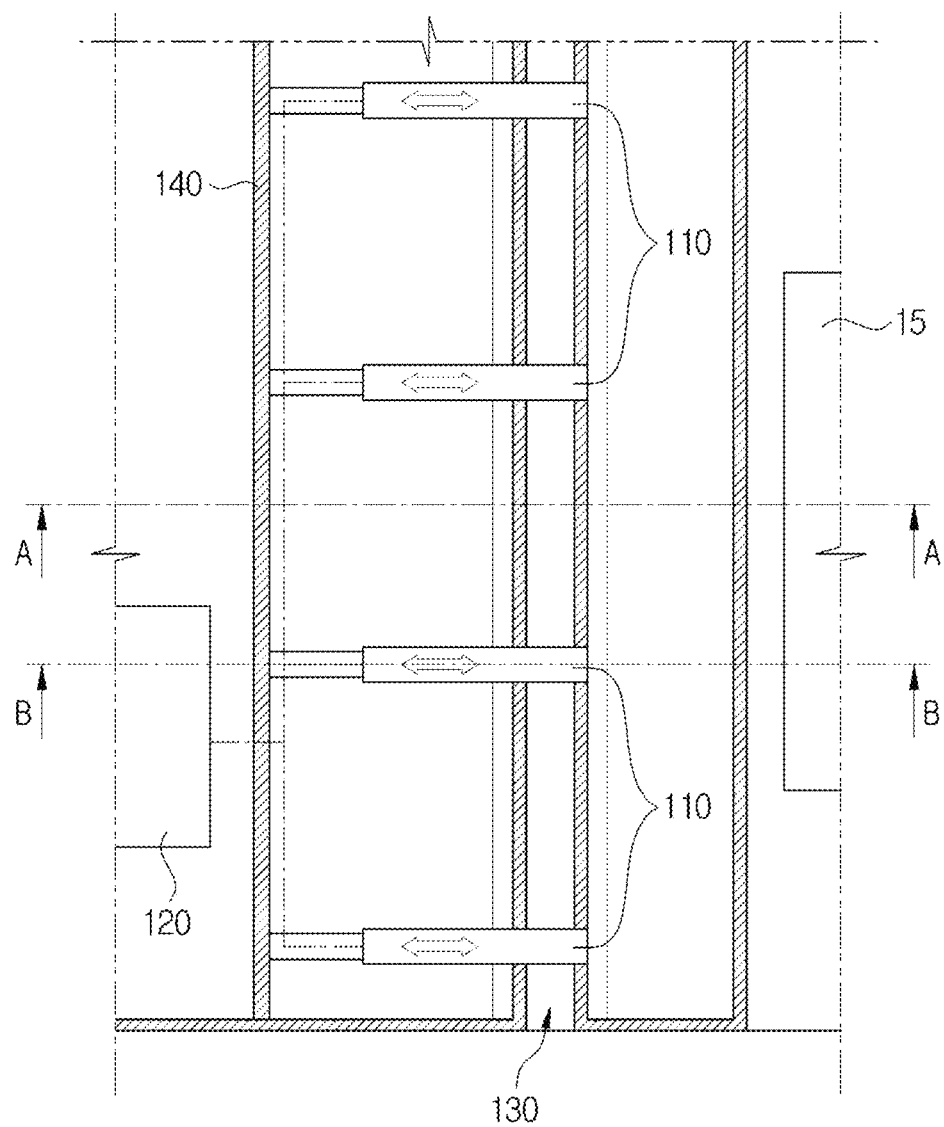
FIG. 6 is a top plan view of the module fixing device according to the embodiment.
Figure 7:
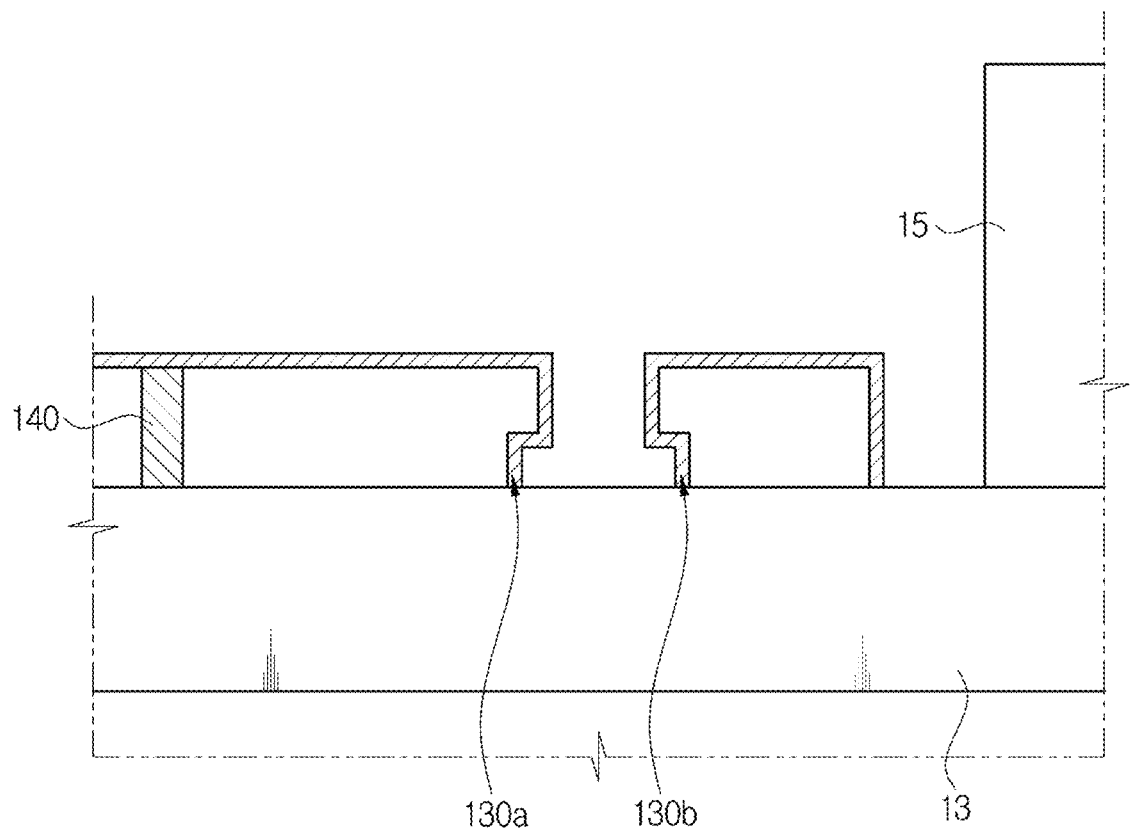
FIGS. 7 and 8 are cross-sectional front views of the module fixing device according to the embodiment.
Figure 8:
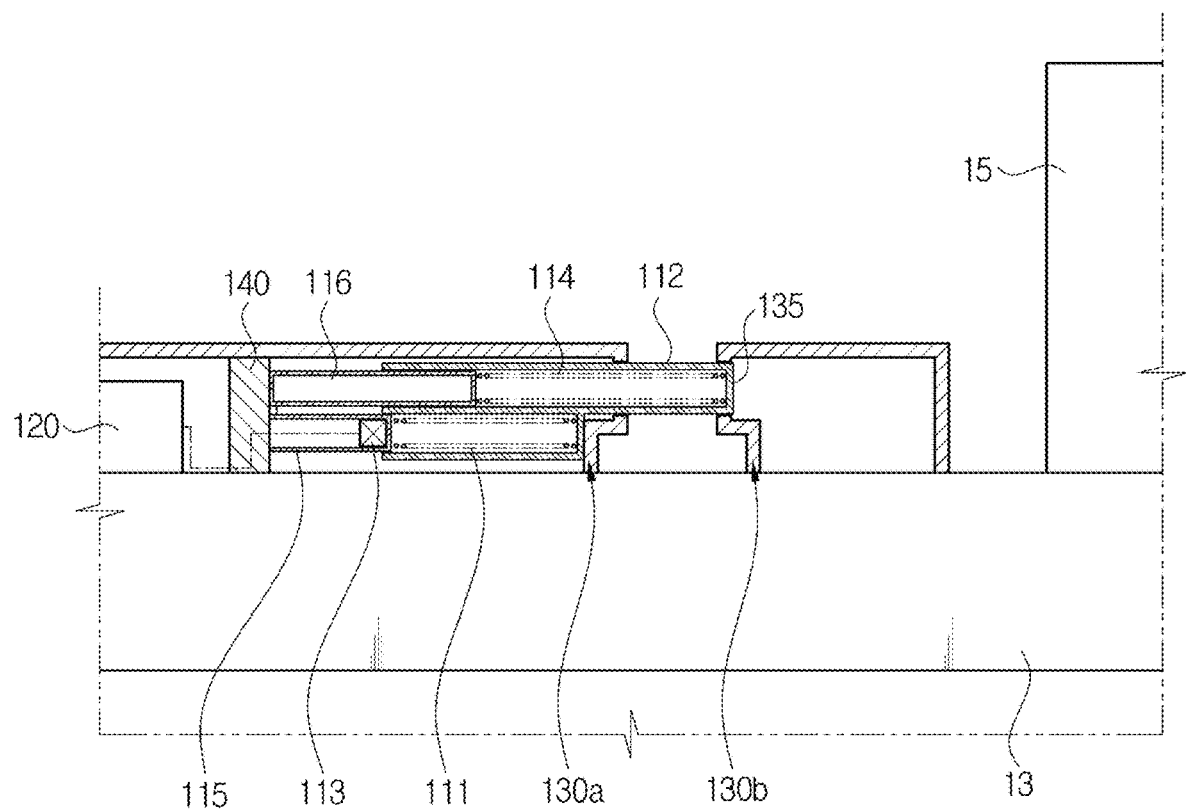
Figure 9:
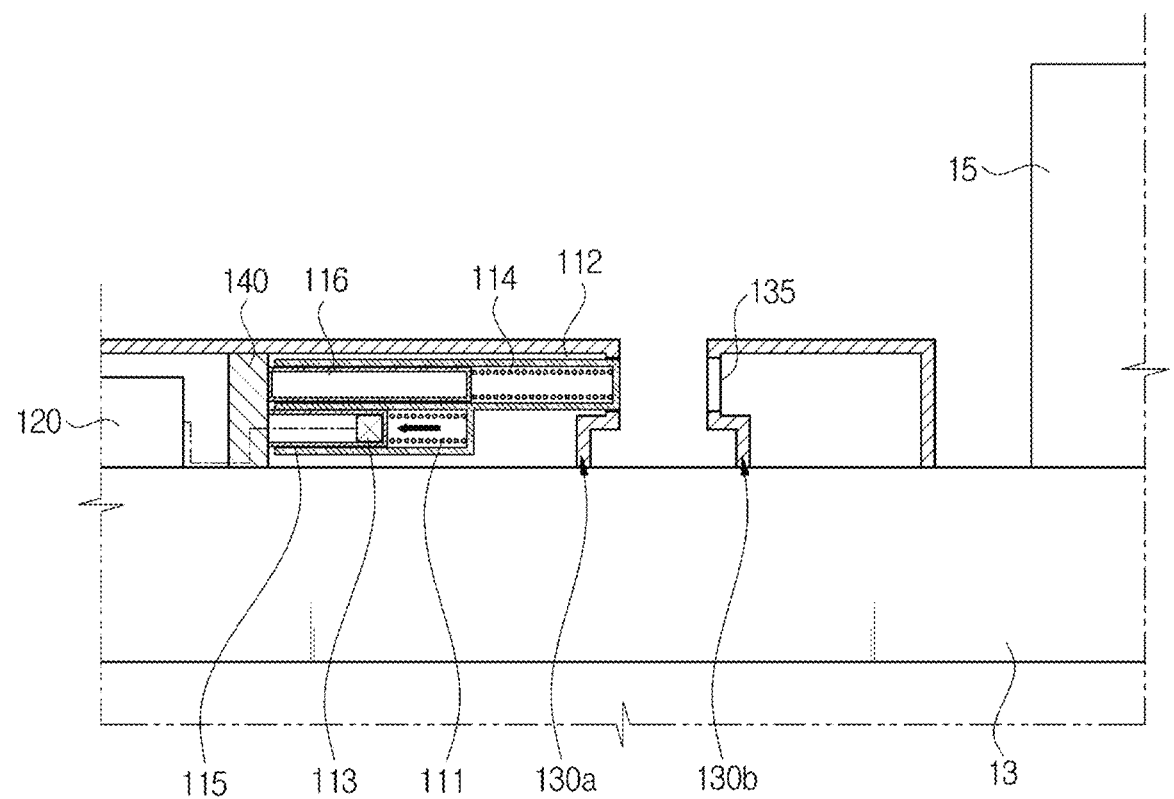
FIG. 9 is a view schematically illustrating an operation of the module fixing device according to the embodiment.

FIG. 5 is a front view of the module fixing device according to the embodiment, FIG. 6 is a top plan view of the module fixing device according to the embodiment, FIGS. 7 and 8 are cross-sectional front views of the module fixing device according to the embodiment, and FIG. 9 is a view schematically illustrating an operation of the module fixing device according to the embodiment.

FIGS. 5 and 6 illustrate the module fixing device 100 based on the guide 130 at one side (right side) of the module fixing device 100 illustrated in FIG. 2. In the embodiment of the present disclosure, the module fixing device 100 may include the two or more guides 130 are illustrated in FIG. 2.

FIG. 5 illustrates a state of the module fixing device 100 when viewed from the rear side of the vehicle 10. The module fixing device 100 may have the guide 130 into which the rail 220 is inserted. As illustrated in FIG. 5, the guide 130 may include members provided at two opposite sides 130a and 130b of a space to define the space into which the rail 220 is inserted.

FIG. 6 is a view illustrating a state of the module fixing device 100 when viewed from the upper side of the vehicle 10. The module fixing device 100 may include one or more locking assemblies 110, and the locking controller 120 configured to control the operation of the locking assembly 110. The locking controller 120 may be electrically connected to the locking assembly 110 and control the operation of the locking controller 120.

FIG. 7 is a cross-sectional view illustrating a section taken along line A-A in FIG. 6. As illustrated in FIG. 7, the module fixing device 100 may have the guide 130 into which the rail 220 is inserted. As illustrated in FIG. 5, the guide 130 may include members provided at two opposite sides 130a and 130b of the space to define the space into which the rail 220 is inserted.

FIG. 8 is a cross-sectional view illustrating a section taken along line B-B in FIG. 6. Referring to FIG. 8, the structure for mounting the locking assembly 110 and the guide 130 provided in the module fixing device 100 can be ascertained.

Referring to FIG. 8, the locking assembly 110 according to the embodiment may be provided in the guide 130 and matched with and inserted into the fixing hole 210 provided in the rail 220.

As illustrated in FIGS. 5 and 8, the locking assembly 110 may be provided at one side 130a of the guide 130 and protrude into the space in the guide 130 when a fixing protrusion 112 operates forward. When the fixing protrusion 112 operates forward, the locking assembly 110 protrudes into the space in the guide 130 and inserted into the fixing hole 210 formed in the rail 220 inserted into the guide 130, such that the multipurpose module 200 may be fixed to the vehicle 10.

Meanwhile, a protrusion fixing groove 135 may be provided at the other side 130b of the guide 130, and the fixing protrusion 112 may be inserted into the protrusion fixing groove 135 when the fixing protrusion 112 operates forward. When the fixing protrusion 112 of the locking assembly 110, which is provided at one side 130a of the guide 130, operates forward, the fixing protrusion 112 may penetrate the fixing hole 210 of the multipurpose module 200 and be inserted into the protrusion fixing groove 135 provided at the other side 130b of the guide 130. As described above, the fixing protrusion 112 provided at one side 130a of the guide 130 penetrates the fixing hole 210 and is inserted into the other side 130b of the guide 130, such that the rail 220 and the fixing protrusion 112 may define a cross-locking structure, thereby maintaining secure coupling.

Meanwhile, the module fixing device 100 may further include a support block 140 configured to support the locking assembly 110 to prevent the locking assembly 110 from being moved rearward by a reaction force when the locking assembly 110 operates forward.

Referring to FIG. 8, the locking assembly 110 according to the embodiment may include: a shape memory spring 111 made of a shape memory alloy; the fixing protrusion 112 connected to the shape memory spring 111 and configured to operate forward to be inserted into the fixing hole 210 or operate rearward to be separated from the fixing hole 210 in accordance with extension or contraction of the shape memory spring 111, and a heater 113 configured to apply heat to the shape memory spring 111.

The shape memory spring 111 may operate the fixing protrusion 112 while being extended or contracted by the applied heat. The shape memory spring 111 is made of a shape memory alloy. The shape memory alloy has a feature that is restored to an original shape by a change in crystal structure in accordance with a change in temperature. In the present disclosure, the spring is made of a shape memory alloy and heated, and the restoring force of the shape memory alloy operates the fixing protrusion 112.

In the embodiment of the present disclosure, in case that no heat is applied to the shape memory spring 111, the fixing protrusion 112 may operate forward. In case that heat is applied to the shape memory spring 111, the fixing protrusion 112 may operate rearward.

That is, as illustrated in FIG. 8, one end of the shape memory spring 111 is coupled to an inner portion of the fixing protrusion 112, and the other end of the shape memory spring 111 is coupled to a shape memory spring plate 115. When the shape memory spring 111 is heated by the heater 113, the shape memory spring 111 is contracted, as illustrated in FIG. 9, such that the shape memory spring 111 may operate the fixing protrusion 112 rearward in the direction toward the shape memory spring plate 115. The rearward operation of the fixing protrusion 112 opens the guide 130 to allow the rail 220 to slide.

FIG. 8 illustrates the embodiment in which the fixing protrusion 112 is operated rearward as the shape memory spring 111 is contracted by being heated, but the present disclosure is not limited thereto. In another embodiment, the fixing protrusion 112 may be configured to be operated rearward by the extension of the shape memory spring 111.

Meanwhile, the locking assembly 110 may further include a reaction force spring 114 configured to apply an elastic force to the fixing protrusion 112 in a forward direction. In case that no heat is applied to the shape memory spring 111, the reaction force spring 114 operates the fixing protrusion 112 forward, such that the fixing protrusion 112 may be inserted into the fixing hole 210 of the rail 220 coupled to the guide 130.

Referring to FIG. 8, the fixing protrusion 112 according to the embodiment includes two cylinders, and the shape memory spring 111 and the reaction force spring 114 are respectively accommodated in the cylinders. One end of the shape memory spring 111 is coupled to an inner portion of the cylinder of the fixing protrusion 112, and the other end of the shape memory spring 111 is coupled to the shape memory spring plate 115. One end of the reaction force spring 114 is coupled to an inner portion of the cylinder of the fixing protrusion 112, and the other end of the reaction force spring 114 is coupled to a reaction force spring plate 116. The shape memory spring plate 115 and the reaction force spring plate 116 may be supported by the support block 140. When the fixing protrusion 112 is operated rearward, the shape memory spring 111 and the reaction force spring 114 are compressed and decreased in length, and the shape memory spring plate 115 and the reaction force spring plate 116 are respectively inserted into the cylinders in which the springs are respectively accommodated, such that the fixing protrusion 112 may be moved rearward toward the support block 140.

That is, in case that the shape memory spring 111 is deformed in shape as the heat is applied by the heater 113, the shape memory spring 111 is contracted and operates the fixing protrusion 112 rearward. In case that no heat is applied by the heater 113, the elastic force of the reaction force spring 114, which is compressed by the rearward operation, operates the fixing protrusion 112 forward.

The driving power implemented by the shape deformation of the shape memory spring 111 made by heating is higher than the elastic force of the reaction force spring 114, such that the fixing protrusion 112 may operate rearward. When the shape memory spring 111 is not heated, the elastic force of the shape memory spring 111 is lower than the elastic force of the reaction force spring 114, such that the fixing protrusion 112 may operate forward.

The driving power implemented by the shape deformation of the shape memory spring 111 and the elastic force of the reaction force spring 114 may be adjusted in accordance with not only the characteristics of the shape memory spring 111 and the reaction force spring 114, but also lengths of the shape memory spring plate 115 and the reaction force spring plate 116 that are respectively in contact with an end of the shape memory spring 111 and an end of the reaction force spring 114. That is, a designer of the locking assembly 110 according to the present disclosure may operate the fixing protrusion 112 forward or rearward, in accordance with whether the heat is applied by the heater 113, by adjusting the characteristics of the shape memory spring 111 and the reaction force spring 114 by changing materials, sizes, and the like of the shape memory spring 111 and the reaction force spring 114 and determining the lengths of the shape memory spring plate 115 and the reaction force spring plate 116.

In the present disclosure, the state in which the fixing protrusion 112 is operated forward may be maintained when the shape memory spring 111 is not heated by the heater 113. That is, when the shape memory spring 111 is not heated by the heater 113, the fixing protrusion 112 is kept inserted into the fixing hole 210 to fix the multipurpose module 200.

In the embodiment of the present disclosure, the locking controller 120 may control the forward or rearward operation of the fixing protrusion 112 by controlling the heating operation of the heater 113. At the time of separating the coupled multipurpose module 200, replacing the multipurpose module 200, or coupling the multipurpose module 200 to the empty luggage zone 11, the locking controller 120 may perform control to heat the heater 113 and operate the fixing protrusion 112 rearward to enable the rail 220 of the multipurpose module 200 to slide along the guide 130.

That is, in the present disclosure, when the locking controller 120 does not perform control, the fixing protrusion 112 operates forward, such that the fixing protrusion 112 may fix the multipurpose module 200 by being fastened to the fixing hole 210 in case that the multipurpose module 200 is coupled, or the fixing protrusion 112 may traverse the guide 130 and be inserted into the protrusion fixing groove 135 provided at the other side in case that the multipurpose module 200 is not coupled.

With the above-mentioned configuration, it is possible to prevent an accident caused by sudden separation of the multipurpose module 200 because the multipurpose module 200 may be kept coupled without being separated from the vehicle 10 even though the locking controller 120 is broken down.

The heater 113 generates heat and transfer the heat to the shape memory spring 111 under the control of the locking controller 120. Various heat generator, which generates heat under the control of the locking controller 120, may be used as the heater 113. In the embodiment, the heater 113 may be configured as a positive temperature coefficient (PTC) heater.

Figure 10:
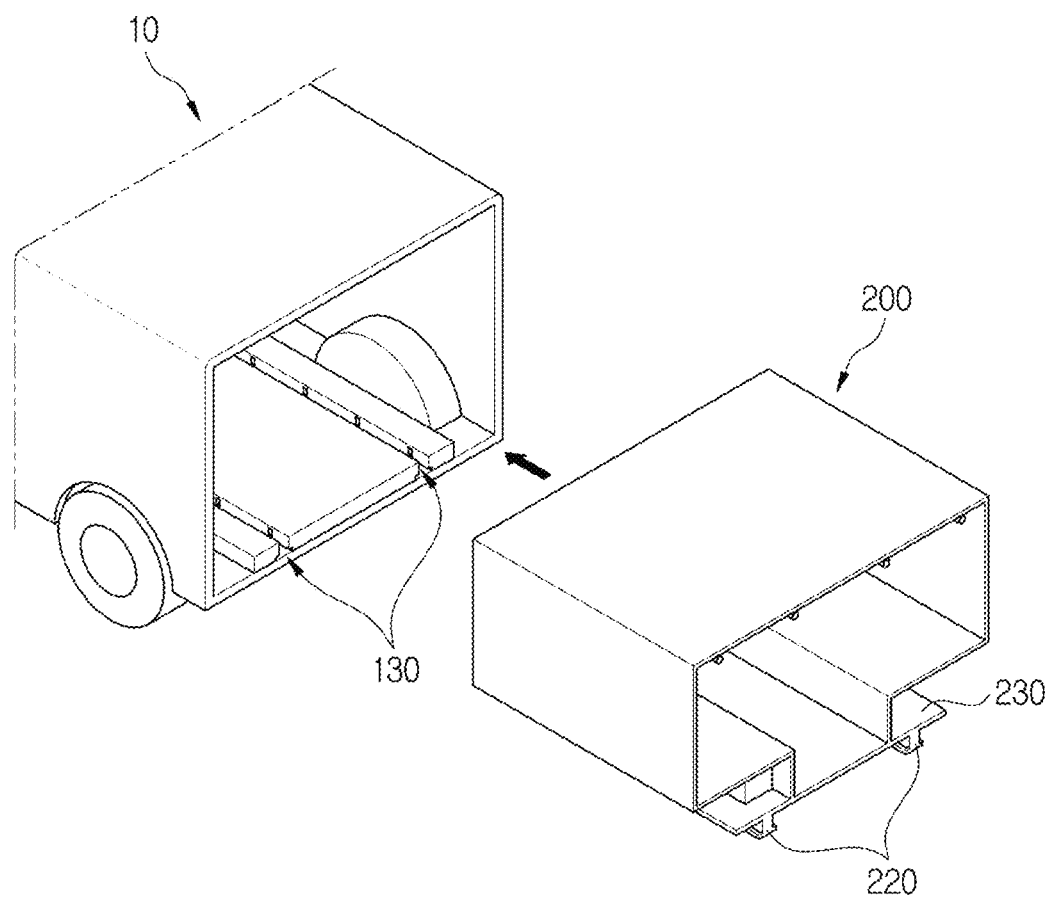
FIGS. 10 and 11 are views schematically illustrating that the multipurpose module is coupled to the vehicle according to the embodiment.
Figure 11:
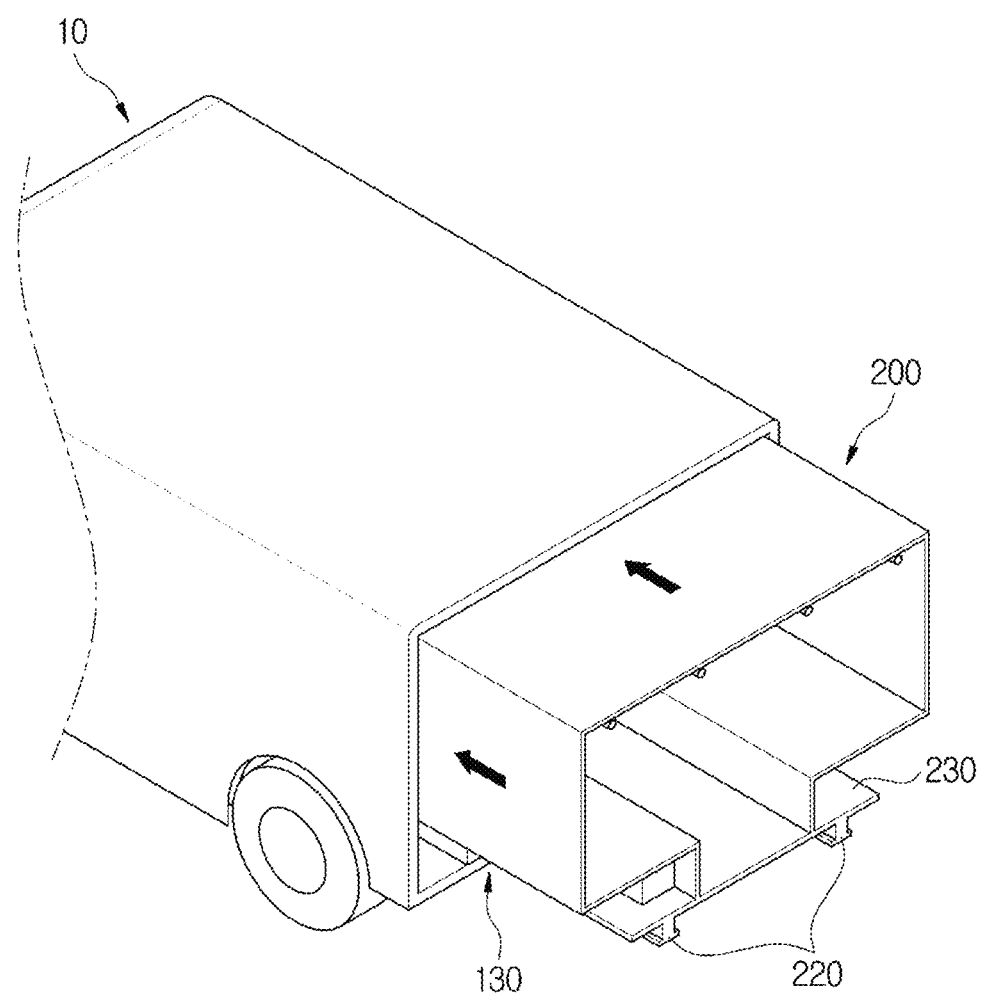

FIGS. 10 and 11 are views schematically illustrating that the multipurpose module is coupled to the vehicle according to the embodiment.

As illustrated in FIGS. 10 and 11, the fixing protrusion 112, which has traversed the guide 130 and moved forward, needs to be operated rearward to couple the multipurpose module 200 to the luggage zone 11 of the vehicle 10.

Therefore, at the time of coupling the multipurpose module 200, the multipurpose module 200 needs to be coupled, as illustrated in FIGS. 10 and 11, by allowing the locking controller 120 to operate the heater 113 first, allowing the heater 113 to heat the shape memory spring 111, and operating the shape memory spring 111 to operate the fixing protrusion 112 rearward.

As illustrated in FIG. 10, to couple the multipurpose module 200, the rail 220 of the multipurpose module 200 is aligned with the guide 130 of the module fixing device 100, and the rail 220 is coupled to the guide 130 while sliding along the guide 130, as illustrated in FIG. 11.

Figure 12:
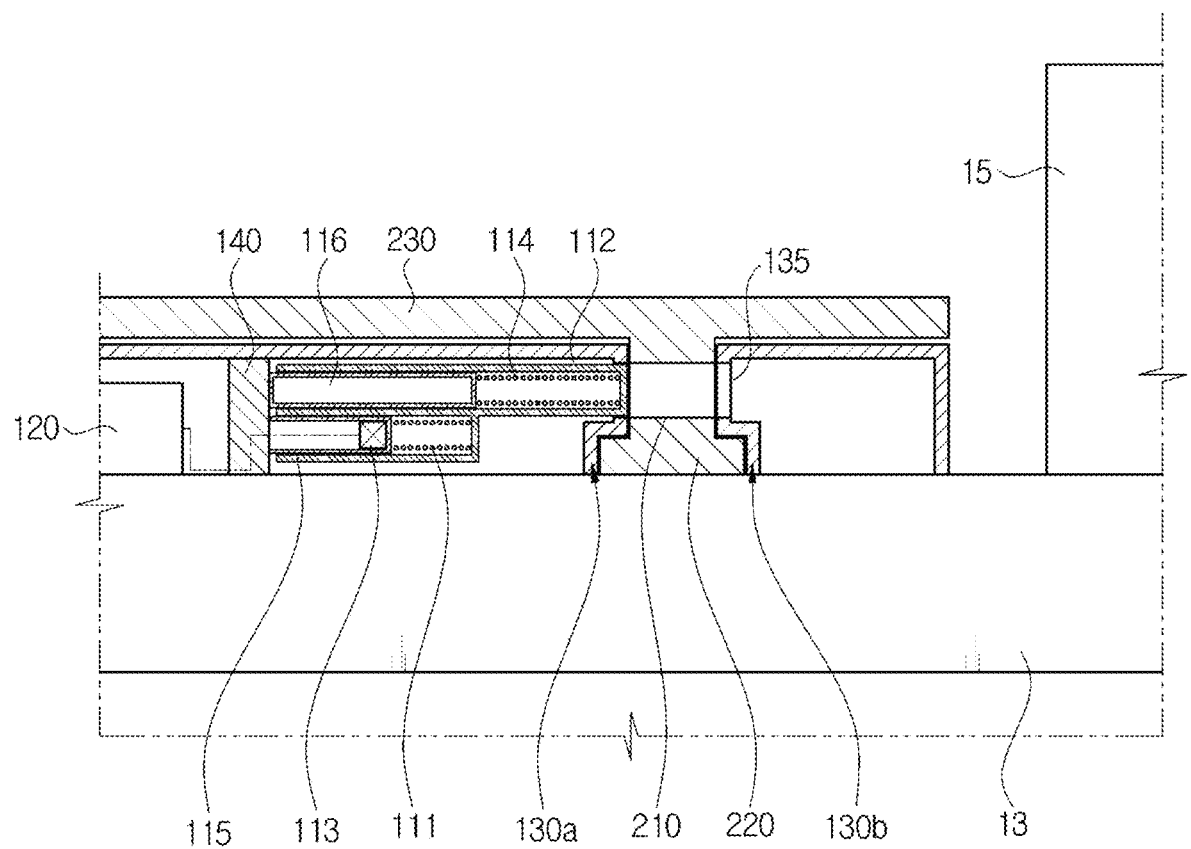
FIGS. 12 and 13 are views schematically illustrating an operation of the module fixing device according to the embodiment.
Figure 13:
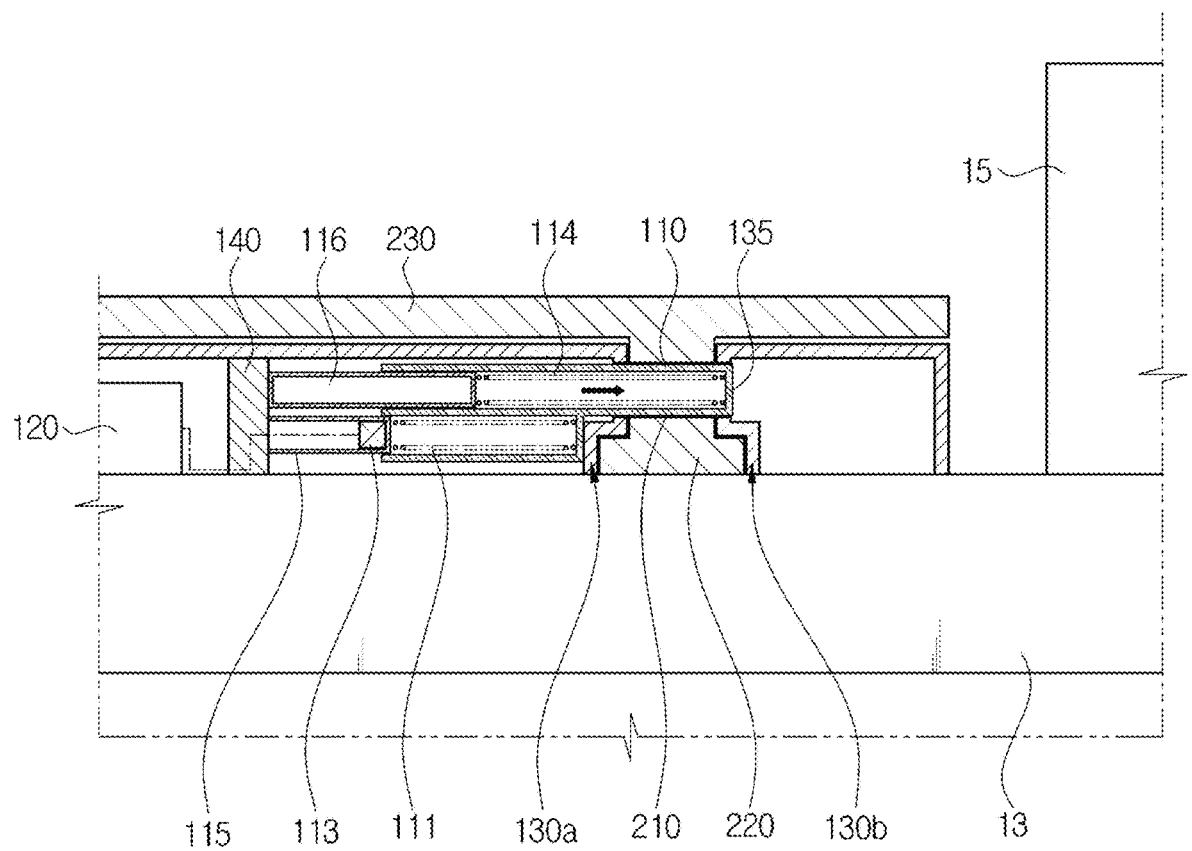
Figure 14A:
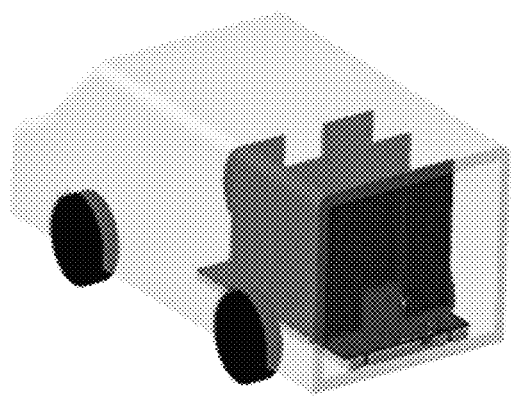
FIGS. 14A, 14B, 14C, 14D, and 14E are views schematically illustrating multipurpose module according to the embodiment.
Figure 14B:
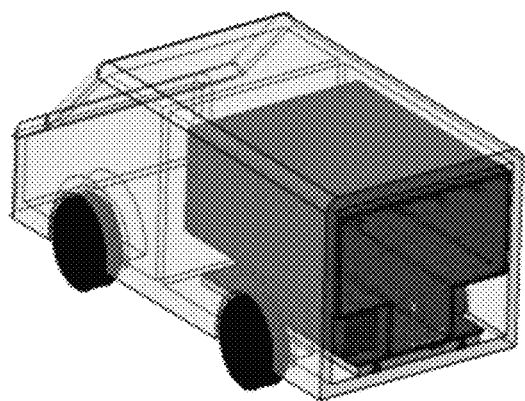
Figure 14C:
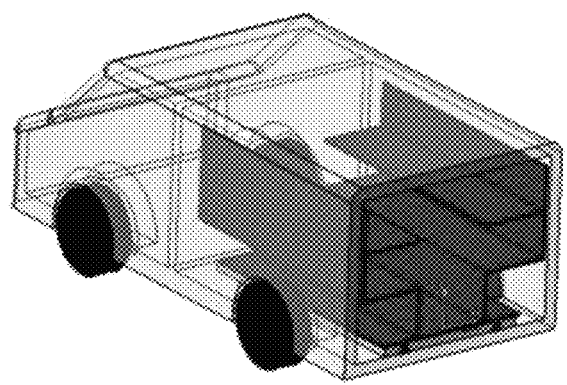
Figure 14D:
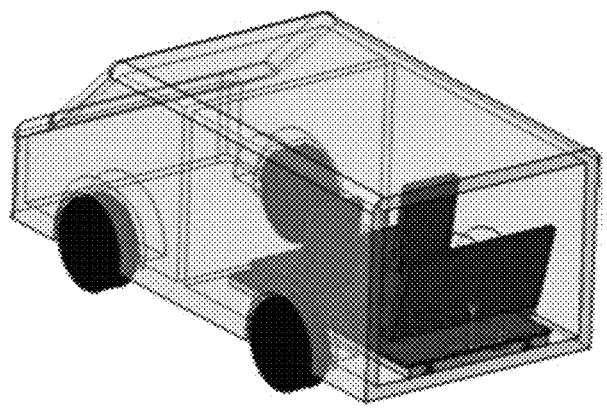
Figure 14E:
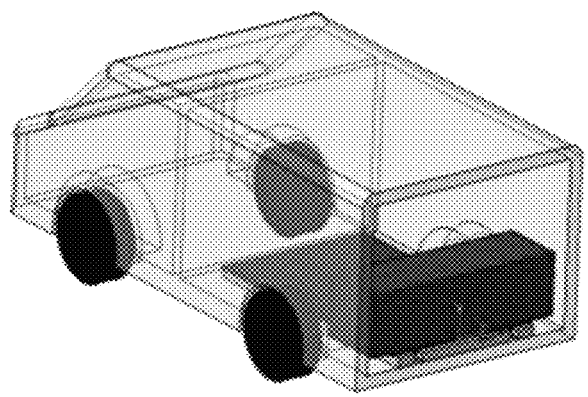

FIGS. 12 and 13 are views schematically illustrating an operation of the module fixing device according to the embodiment.

FIG. 12 is a cross-sectional view illustrating a section taken along line B-B of the module fixing device 100 after the rail 220 of the multipurpose module 200 is inserted into the guide 130 to couple the multipurpose module 200 to the luggage zone 11 of the vehicle 10, as illustrated in FIGS. 10 and 11.

The shape memory spring 111 is heated by the heater 113 under the control of the locking controller 120, such that the fixing protrusion 112 operates forward, and then the rail 220 is inserted into the guide 130. As illustrated in FIG. 12, in case that the rail 220 is inserted into the guide 130, the position of the locking assembly 110 and the position of the fixing hole 210 provided in the rail 220 may be matched and aligned.

As illustrated in FIG. 6, in case that the plurality of locking assemblies 110 is provided in the guide 130, the plurality of fixing holes 210 may also be provided in the rail 220 to be inserted into the guide 130, and the positions of the plurality of fixing holes 210 may correspond to the positions of the plurality of locking assemblies 110.

Meanwhile, as illustrated in FIG. 13, the rail 220 according to the embodiment may be the T-shaped rail 220 including the web coupled to the fixing base 230 and the flange coupled to the web, and the guide 130 may have a shape corresponding to the T-shaped rail. In the embodiment in which the rail 220 includes the web and the flange and the guide 130 has the shape corresponding to the rail 220, the guides 130 may be provided at two opposite sides of the web to prevent the rail 220 from moving to the left and right sides of the guide 130, and the flange is fastened to the guides 130 to prevent the rail 220 from separating upward from the guide 130.

After the rail 220 is inserted into the guide 130 and the position of the locking assembly 110 and the position of the fixing hole 210 provided in the rail 220 are matched as illustrated in FIG. 12, the fixing protrusion 112 of the locking assembly 110 operates forward and is inserted into the fixing hole 210 as illustrated in FIG. 13.

The fixing protrusion 112 is operated rearward as the shape memory spring 111 is heated by the heater 113. Thereafter, when the heating operation of the heater 113 is stopped by the locking controller 120, the driving power implemented by the shape deformation of the shape memory spring 111 is eliminated, and the fixing protrusion 112 is operated forward again by the elastic force of the reaction force spring 114. The fixing protrusion 112 may be inserted into the fixing hole 210 by being operated forward by the elastic force of the reaction force spring 114 under the control of the locking controller 120.

Meanwhile, the fixing protrusion 112 may be not only inserted into the fixing hole 210 while operating forward, but also inserted into the protrusion fixing groove 135 provided at the other side 130b of the guide 130 while penetrating the fixing hole 210. Because the fixing protrusion 112 is provided at one side 130a of the guide 130 and inserted into the other side 130b of the guide 130 while penetrating the fixing hole 210, the rail 220 and the fixing protrusion 112 may define a cross-locking structure, thereby maintaining secure coupling.

According to the multipurpose module, the module fixing device, and the locking assembly for a vehicle according to one aspect, it is possible to conveniently change the purposes of the vehicle by using the locking assembly and fixing the multipurpose module equipped with the constituent component suitable for the purpose of the vehicle body.

According to the multipurpose module, the module fixing device, and the locking assembly for a vehicle according to one aspect, it is possible to efficiently couple a coupling object by inserting the locking assembly into the fixing hole provided in the coupling object by operating the locking assembly by using the shape memory spring.

As described above, the embodiments have been described with reference to the accompanying drawings. A person skilled in the art may understand that the present disclosure may be carried out in other forms different from those disclosed in the embodiments without changing the technical spirit or the essential features of the present disclosure. The disclosed embodiments are illustrative and should not be interpreted as being restrictive.

The invention claimed is:

1. A vehicle comprising:
a multipurpose module replaceably coupled to a luggage zone of the vehicle; and
a module fixing device coupled to the multipurpose module, and configured to fix the multipurpose module to a vehicle body of the vehicle;
wherein the module fixing device comprises:
one or more locking assemblies configured to fix the multipurpose module by being matched and inserted into a fixing hole positioned in the multipurpose module; and
a locking controller configured to control the locking assembly;
wherein the locking assembly comprises:
a shape memory spring made of a shape memory alloy;
a fixing protrusion connected to the shape memory spring and configured to move forward to be inserted into the fixing hole, or to move rearward to be separated from the fixing hole in accordance with extension or contraction of the shape memory spring; and
a heater configured to apply heat to the shape memory spring.

2. The vehicle of claim 1,
wherein the shape memory spring operates the fixing protrusion while being extended or contracted by the applied heat.

3. The vehicle of claim 2, wherein the fixing protrusion moves forward when no heat is applied to the shape memory spring, and the fixing protrusion moves rearward when heat is applied to the shape memory spring.

4. The vehicle of claim 3, wherein the locking assembly further comprises a reaction force spring configured to apply an elastic force to the fixing protrusion in a forward direction, and wherein driving power implemented by shape deformation of the shape memory spring is higher than the elastic force of the reaction force spring.

5. The vehicle of claim 2, wherein a rail is provided on the multipurpose module, and a guide is positioned on the module fixing device, such that the module fixing device and the multipurpose module are coupled as the rail is inserted into the guide, and wherein the locking assembly is positioned in the guide and matched and inserted into the fixing hole positioned in the rail.

6. The vehicle of claim 5, wherein the locking assembly is provided at one side of the guide and protrudes when the fixing protrusion moves forward, and wherein a protrusion fixing groove is positioned at the other side of the guide, and the fixing protrusion is inserted into the protrusion fixing groove when the fixing protrusion moves forward.

7. The vehicle of claim 5, wherein the multipurpose module comprises a fixing base on which a constituent component is mounted, and the rail is positioned at a lower side of the fixing base.

8. The vehicle of claim 7, wherein the rail is a T-shaped rail comprising a web coupled to the fixing base, and a flange coupled to the web, and wherein the fixing hole is positioned in the web.

9. The vehicle of claim 1, wherein the multipurpose module is coupled to the module fixing device in a forward or a rearward direction.

10. A module fixing device for a vehicle, the module fixing device comprising:
 one or more locking assemblies configured to fix a multipurpose module by being matched and inserted into a fixing hole positioned in the multipurpose module replaceably coupled to a luggage zone of a vehicle; and
 a locking controller configured to control the locking assembly;
 wherein the locking assembly comprises:
 a shape memory spring made of a shape memory alloy;
 a fixing protrusion connected to the shape memory spring and configured to move forward to be inserted into the fixing hole, or to move rearward to be separated from the fixing hole in accordance with extension or contraction of the shape memory spring; and
 a heater configured to apply heat to the shape memory spring;
 wherein the shape memory spring operates the fixing protrusion while being extended or contracted by the applied heat.

11. The module fixing device of claim 10, wherein the fixing protrusion moves forward when no heat is applied to the shape memory spring, and the fixing protrusion moves rearward when heat is applied to the shape memory spring.

12. The module fixing device of claim 11, wherein the locking assembly further comprises a reaction force spring configured to apply an elastic force to the fixing protrusion in a forward direction, and wherein driving power implemented by shape deformation of the shape memory spring is higher than the elastic force of the reaction force spring.

13. The module fixing device of claim 10, wherein the module fixing device has a guide into which a rail positioned on the multipurpose module is inserted, such that the module fixing device and the multipurpose module are coupled as the rail is inserted into the guide, and wherein the locking assembly is provided in the guide and matched and inserted into the fixing hole positioned in the rail.

14. The module fixing device of claim 13, wherein the locking assembly is positioned at one side of the guide and protrudes when the fixing protrusion moves forward, and wherein a protrusion fixing groove is positioned at the other side of the guide, and the fixing protrusion is inserted into the protrusion fixing groove when the fixing protrusion moves forward.

15. A multipurpose module, which is replaceably coupled to a vehicle, the multipurpose module comprising:
 a fixing hole into which a locking assembly provided and operated in the vehicle is matched and inserted; and
 a rail inserted into a guide positioned in the vehicle and configured to couple the multipurpose module to the vehicle;
 wherein the locking assembly comprises:
 a shape memory spring made of a shape memory alloy;
 a fixing protrusion connected to the shape memory spring and configured to move forward to be inserted into the fixing hole, or to move rearward to be separated from the fixing hole in accordance with extension or contraction of the shape memory spring; and
 a heater configured to apply heat to the shape memory spring.

16. The multipurpose module of claim 15, wherein the fixing hole is positioned in the rail.

17. The multipurpose module of claim 15, wherein the multipurpose module further comprises a fixing base on which a constituent component is mounted, and the rail is positioned at a lower side of the fixing base.

18. The multipurpose module of claim 17, wherein the rail is a T-shaped rail comprising a web coupled to the fixing base, and a flange coupled to the web, and wherein the fixing hole is positioned in the web.

* * * * *